Feb. 13, 1968  H. G. KUHLMAN  3,368,501
FOOD DISTRIBUTING APPARATUS
Filed Feb. 8, 1965  2 Sheets-Sheet 2

INVENTOR.
HARVEY G. KUHLMAN
BY
Andrus & Starke
Attorneys

# United States Patent Office 3,368,501
Patented Feb. 13, 1968

3,368,501
FOOD DISTRIBUTING APPARATUS
Harvey G. Kuhlman, N. 56, W. 21466 Silver Spring Road, Menomonee Falls, Wis. 53051
Filed Feb. 8, 1965, Ser. No. 430,960
16 Claims. (Cl. 107—1)

ABSTRACT OF THE DISCLOSURE

A conveyor is provided to carry a series of rows of pizza bases sequentially through a sauce applicator, a sausage applicator and a shredded cheese applicator. The sauce applicator sprays a suitable sauce onto the bases as they move therethrough and the sausage applicator automatically applies individual pieces of meat in spaced relation onto the pizza bases. The cheese applicator includes a main transfer conveyor having a plurality of laterally spaced belts which carry the rows of pizza bases from the sausage applicator. A cheese conveyor is mounted above the main transfer conveyor and receives the shredded cheese from a lift conveyor in mounds extending longitudinally thereacross. A rake assembly spreads the cheese over the cheese conveyor before the conveyor drops the shredded cheese onto the pizza bases. A tined beater is rotatably mounted in closely spaced relation to the discharge end of the cheese conveyor to discharge a closely regulated amount of the shredded cheese from the cheese conveyor onto the pizza bases as they pass beneath. Return conveyors are provided to transfer any shredded cheese which drops between the belts back to the lift conveyor.

---

This invention relates to food distributing apparatus and particularly to an automatic means and apparatus for applying ingredients to a base member such as applying of the ingredients to a pizza crust base including sauce, meat, shredded cheese and the like.

Generally, the sale of frozen pizza through grocery stores and the like has developed into a substantial business. Frozen pizza is presently generally made by hand labor with the tomato sauce and shredded cheese applied manually to a preformed crust base, frozen and packaged for distribution. Often, sausage is distributed over the base and within the sauce before applying the cheese. The purchaser need only heat the pizza to place it in condition for serving.

The manual processing of the ingredients and general handling of the pizza in production is time consuming and expensive. Further, quality control is quite difficult particularly in connection with the application of the sauce and the shredded cheese. Sausage and the like can be accurately metered and subsequently divided and applied. However, the sauce and shredded cheese cannot be economically and practically separated and metered in large scale mass productions of frozen pizzas.

The present invention is particularly directed to an automatic apparatus including means which can automatically apply the tomato sauce, sausage where desired, and the shredded cheese to a plurality of pizza bases as they are moved continuously and progressively through the processing apparatus. In particular, a unique means is provided for applying each of the ingredients. In particular, the shredded cheese is uniformly applied in closely metered quantity. The apparatus is generally universally applicable to various sized pizza bases and thus provides a very important improvement in the art of forming pizzas.

Generally, in accordance with the present invention, the pizzas are mounted on a multiple conveyor mechanism for sequential movement through the sauce applicator, the sausage applicator and the shredded cheese applicator. The sauce is applied by spraying of the sauce downwardly over the bases as they move through the sauce applicator. A uniform and closely regulated amount of sauce is applied to each of the plurality of the bases. Within the sausage applicator, the pizza bases are momentarily stopped and aligned with a sausage applicating plate upon which a plurality of pieces of spaced meat are releasably held. When properly aligned, the meat pieces are simultaneously released and automatically applied to the aligned pizza base. Preferably, the applicator includes a sausage patty forming and distributing mechanism which forms small patties of sausage into groups distributed within the plate in a manner as each group appears on a pizza base. The applicating plate is then aligned with the row of pizza bases passing through the sausage applicator. The group of sausage patties is forced from the plate onto the aligned pizza base and particularly within the previously applied sauce by suitable ejector means. From the sausage unit, the row of pizza bases with the sauce and the sausage thereon pass through the cheese applicator.

Generally, the cheese applicator of the present invention includes a main base transfer conveyor including a plurality of laterally spaced support and transfer elements which are adapted to progressively move the pizza bases through the cheese applicator. Immediately above the base transfer conveyor, a cheese transfer conveyor is provided for continuously carrying a quantity of shredded cheese to a discharge end from which the shredded cheese falls under gravity. Immediately adjacent the discharge end of the cheese conveyor, a beater includes a plurality of tines and is rotatably mounted to rotate in the opposite direction of the movement of the cheese. The beater is closely spaced from the discharge end of the cheese conveyor such that only a closely regulated amount of the cheese can pass between the beater and the conveyor and drop onto the pizza bases as they pass therebeneath. Additionally, a cheese distributing mechanism is provided immediately forwardly of the beater to prevent abnormal buildup of cheese adjacent the beater.

The shredded cheese is preferably applied to the transfer mechanism through a system including an inclined or lift conveyor which begins below and to the discharge side of the main conveyor and extends upwardly with the upper end disposed immediately above a lateral transfer conveyor. The transfer conveyor is adapted to carry the shredded cheese laterally over the starting end of the cheese conveyor. A wiper mechanism is provided for reciprocal movement over the top of the lateral transfer conveyor and is actuated in timed relation with the transfer belt such that each time the portion of the transfer belt aligned with the cheese conveyor is filled with shredded cheese, the wiper is actuated to transfer the cheese onto the cheese conveyor. The wiper is preferably hydraulically actuated to provide precise accurate actuation and transfer of the cheese onto the conveyor unit.

Although the shredded cheese is transferred in a relatively concentrated form, the rake assembly distributes the cheese on the conveyor and in combination with the beater maintains close regulation of the shredded cheese applied to the pizza bases.

Additionally, a plurality of overrun return conveyors are provided. One of the latter conveyors extends laterally beneath the laterally spaced main base conveyor such that any cheese which falls therethrough is picked up by the return conveyor and carried back to the lift conveyor for recirculation and application to subsequent pizza bases. A similar return conveyor is provided adjacent the terminal end of the main base cover to recover excess shredded cheese falling therefrom.

The present invention thus provides an automatic means for forming pizzas and one in which the ingredients thereto can be closely regulated and in particular in which the shredded cheese can be accurately metered and applied to the pizzas in a continuous manner and at a high rate.

The drawings furnished herewith illustrate a preferred construction of the present invention disclosing the above features and advantages as well as others which will be clear from the following description.

Figure 1:
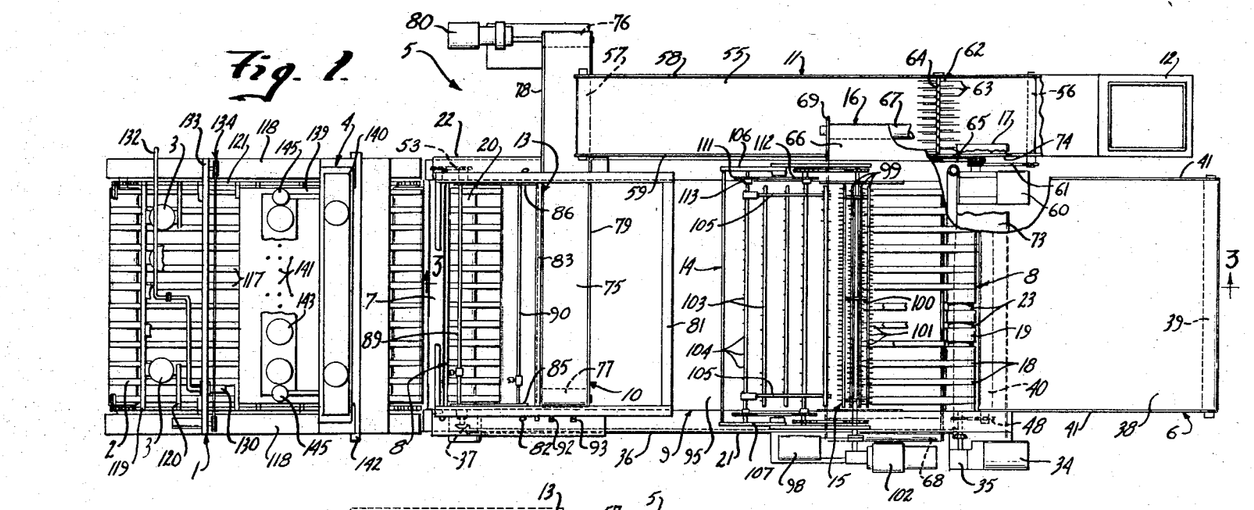
FIG. 1 is a top elevational view of an automatic pizza apparatus constructed in accordance with the present invention.
Figure 2:
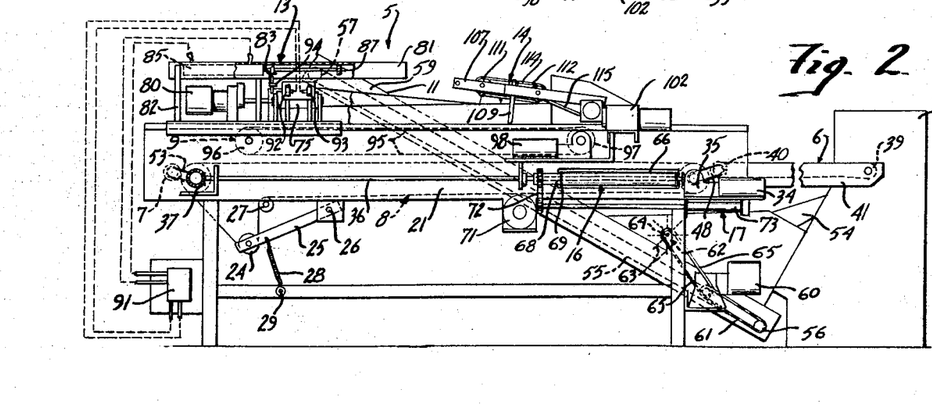
FIG. 2 is a side elevational view of the cheese applicator shown in FIG. 1.

Referring to the drawings and particularly to FIGS. 1 and 2, the illustrated embodiment of the invention is shown including a sauce applicator 1 having a conveyor 2 of an open construction, as hereinafter described upon which the pizza crusts or bases 3 are disposed in lateral rows of a plurality of bases in side-by-side relation for a simultaneous movement through the applicator. A sausage applicator 4 is provided immediately following the sauce applicator 1 to provide for the application of sausage patties, not shown, or the like to the sauce covered bases, where desired. If the pizza is to be formed merely with sauce and cheese, the applicator 4 is held inactive with the bases 3 moving therethrough on the conveyor 2 forming a common unit for applicators 1 and 4 and transferred to a cheese applicator 5. In passing through applicator 5, shredded cheese is uniformly and simultaneously applied over the side-by-side pizza bases 3. The formed pizzas are finally fed to a discharge conveyor 6 shown as a terminal end of the apparatus and providing for manual removal of the formed pizzas. Normally, the pizzas are transferred to a freezer and subsequently to a boxing or other packaging unit. If desired, the conveyor 6 can be elongated and automatically pass the pizzas through a tunnel freezer or the like and from the freezer directly to an automatic boxing equipment. Such tunnel freezers and boxing eqiupment are readily available and therefore have not been shown or otherwise described.

More particularly, in the illustrated embodiment of the invention, a new and novel cheese applicator 5 is shown and includes a transfer roller 7 bridging a gap between the conveyor 2 of the sausage applicator 4 and a pizza base transfer conveyor 8 of an open or apertured construction similar to conveyor 2 of applicator 5 such that the row of bases 3 moves into the applicator 5. Immediately above the base transfer conveyor 8 is a cheese transfer conveyor 9 having its terminal end spaced inwardly of the discharge end of the conveyor 8. The shredded cheese is transferred from the conveyor 9 onto the pizzas immediately below the discharge end thereof by gravity feed.

The shredded cheese is applied to the inlet end of conveyor 9 by a lateral conveyor 10 which extends laterally to one side of the conveyor and beneath the terminal end of a lift conveyor 11 which extends angularly downwardly and terminates at the lower end forwardly of the conveyor 8. A conventional cheese shredder 12 is provided to accept cheese in block form, rapidly shred it and feed it directly to the lower end of the lift conveyor 11. The shredded cheese is continuously transferred upwardly by the lift conveyor 11 to the lateral conveyor 10 which moves to align the shredded cheese over the cheese transfer conveyor 9. A wiper unit 13 is reciprocably mounted overlying the conveyor 10 and is actuated in properly timed relation to push the cheese aligned therewith onto the conveyor 9. The cheese thus appears on the conveyor 9 in a heaped or mound form. A rake assembly 14 is mounted adjacent the discharge or terminal portion of the conveyor 9 and is actuated to distribute the heaped cheese into a relatively even mass on the discharge portion of the conveyor 9. Immediately adjacent the discharge end of the transfer conveyor 9 a beater or distributor 15 is rotatably mounted for rotation in the opposite direction of the movement of the cheese by the cheese transfer conveyor 9. It cooperates therewith to provide a very close metering opening between the conveyor 9 and the beater 15 such that any excess cheese is thrown back onto the transfer conveyor. In the illustrated embodiment of the invention, a pair of overrun return conveyors 16 and 17 is provided. The overrun conveyor 16 is located immediately beneath the base transfer conveyor 8 and is adapted to take excessive cheese and return any cheese which does not fall onto a base 3 to the lift conveyor 11 for recirculation. Additionally, the conveyor 17 is located adjacent the joint between the main transfer conveyor 8 and the discharge conveyor 6 for returning any falling cheese to the lift conveyor 11 as more fully described hereinafter.

Generally, the operation is briefly summarized as follows. The pizza bases 3 move in side-by-side relation through the cheese applicator 5 on the conveyor 8. The shredded cheese is continuously transferred or carried by the lift conveyor 11 to the lateral conveyor 10. The lateral conveyor which continuously operates has the cheese distributed thereon and moves to align the cheese with the cheese transfer conveyor 9. When it is aligned the scraper unit 13 is actuated and moves across the conveyor 10 very rapidly to push all of the distributed cheese onto the conveyor 9 in a heap extending across the conveyor. The conveyor 9 which is in continuous movement transfers the heaps longitudinally towards the discharge end. When they move into the rake assembly 14, the heaps are distributed onto the conveyor 9 in a more or less uniform thickness somewhat deeper than the metering space provided between the beater 15 and the discharge end of the cheese conveyor 9. The beater 15 continuously rotates in the opposite direction to allow only a very selected or closely regulated amount of the shredded cheese to be discharged therefrom and onto the pizza bases 3 which continuously are moving thereunder. If for any reason a pizza base 3 is missing, the base rows are separated from each other or the like and the excess shredded cheese which is not dropped onto a base falls through the main conveyor 8 onto the overrun conveyor 16. Additionally, as the pizzas move from the main conveyor any cheese which falls between the conveyor 8 and the discharge conveyor 6 drops onto the overrun conveyor 17 and is returned to the lift conveyor 11.

It has been found that this apparatus provides a very accurate means of supplying selected amounts of shredded cheese onto the pizza bases 3. It has been found possible to control the amount of cheese applied to each of the bases within one-tenth of an ounce while maintaining very high rates of production. The cheese applicator 5 can process up to 5800 pizza bases an hour while producing an improved quality control.

Figures 3, 5:
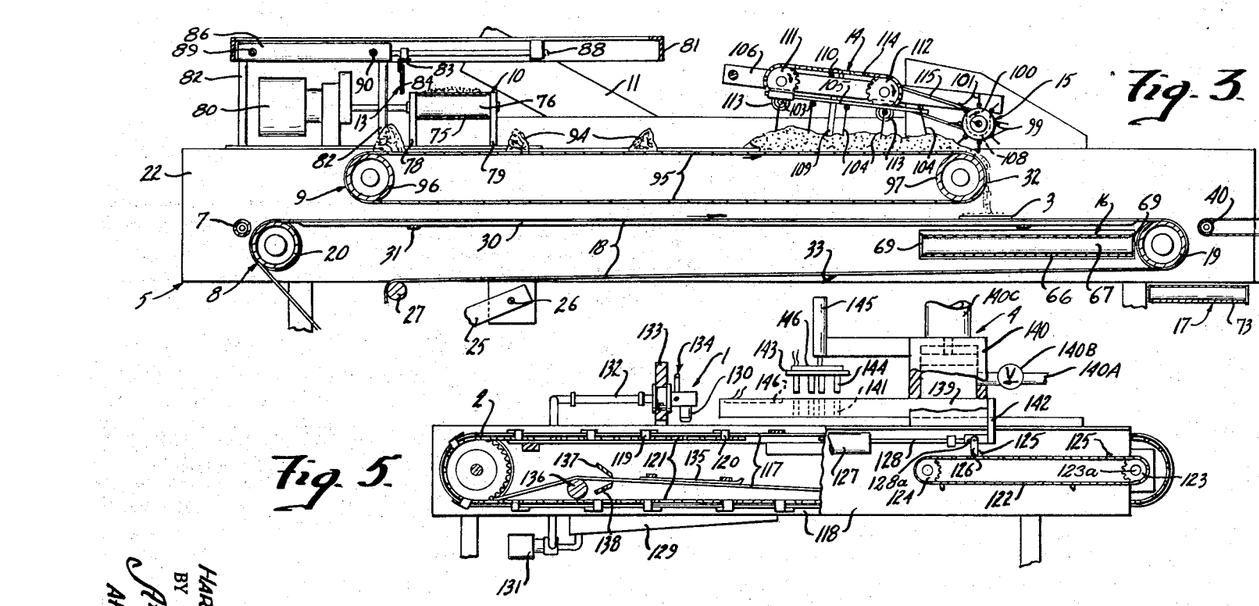
FIG. 3 is an enlarged vertical section taken generally on line 3—3 of FIG. 1 illustrating details of construction of the conveyor and cheese distributing mechanism.
FIG. 5 is an enlarged side elevational view showing the sauce and sausage applicator of FIG. 1.

More particularly, with reference to FIGS. 1–3, inclusive, the pizza base transfer conveyor 8 includes a plurality of endless narrow belts 18 laterally distributed over the width of the cheese applicator 5 to form a slotted type conveyor for moving the bases 3 therethrough. The belts 18 are mounted and supported by a front roller 19 and a similar rear roller 20 which are rotatably journaled in a similar manner at their opposite ends in side walls 21 and 22 forming a part of the superstructure of the applicator. Each of the rollers 19 and 20 is similarly formed with a plurality of longitudinally spaced grooves, as at 23, to accommodate a corresponding belt 18 and maintain accurate spacing of the belts. The belts 18 are held under tension by individual tension rolls 24 secured to the underside of the structure and pulling downwardly on the lower portion of the corresponding belt, as follows. Each tension roll 24 is rotatably mounted at the outer end of an arm 25 which is pivotally secured at the opposite end to the underside of the superstructure as at 26. The lower or return portion of the belt 18 passes over a guide roller 27 mounted immediately above and to the incoming side of the tension roll 24 such that the belt extends vertically downwardly and then passes around the tension roll 24. Tension springs 28 are connected at one end to the arm 25 and at the opposite end to a cross frame member 29 to provide selected downward tension of the underside of the belt 18 and disposing the upper surface in a generally horizontal plane.

Additionally, stainless steel support strips 30 of a width corresponding to each of the belts 18 are disposed immediately below the upper portion of each belt to support the pizza bases 3 and prevent sagging of the belts. The support strips are mounted in any suitable manner as by cross braces 31 secured at their opposite ends to the side walls 21 and 22 of the applicator.

As the pizza bases 3 are carried by the belts 18 through the applicator 5 and pass immediately below the discharge end of the cheese transfer conveyor 9, shredded cheese 32 drops therefrom onto the bases 3 in a very uniform and closely regulated manner, as shown in FIG. 3. Some of the shredded cheese falls onto the upper surface of the belts 18 and is carried with it during the return movement beneath the superstructure. A wiper blade 33 is secured between the side walls 21 and 22 in engagement with the undersurface of the lower portion of belts 18 to remove any such excess cheese which may be allowed to fall on the floor for subsequent removal as waste or may be otherwise accumulated. Generally, the amount is so small that it can be directly considered a waste without any consequential economic loss.

The belts 18 are simultaneously driven by rotation of the rollers 19 and 20, as follows. An electrical motor 34 having an integral gear reducer 35 secured to one end is mounted to the side wall 21. The output of the gear reducer 35 is connected directly to the adjacent roller 19 and through a coupling shaft 36, and a bevel gear unit 37, shown in FIG. 2, to the roller 20.

The motor 34 and gear reducer 35, and all other motors and reducers subsequently described are preferably variable speed output units to permit control of the amount of cheese fed to the bases and are formed as hermetically enclosed assemblies such that the assembly can be steam cleaned and the like without damaging of the motor and the gear reducing mechanism. The other bevel gearing to the rollers and the like will be provided with suitable covers, not shown, to prevent accumulation of dirt and the like. The covers and other support and structural components are formed of a stainless steel or the like to permit steam cleaning. The covers have not been shown for purposes of more clearly illustrating operational details of the structure.

The pizza bases 3 are thus carried through the applicator to the discharge conveyor unit 6 which includes an endless belt 38 of a width generally corresponding to the total width defined by the spaced belts 18. The endless belt 38 is rotatably carried at its opposite ends by a front roller 39 and a back roller 40 with the rollers journaled between suitable side arms 41 connected to and extending forwardly as a part of the walls 21 and 22. The illustrated rollers 39 and 40 and subsequent belt rollers are shown rotatably mounted in fixed bearing units or the like in FIGS. 1–3 for simplicity of illustration and explanation. Preferably, the broad endless belts such as belt 38 are mounted on the opposite ends to permit loosening thereof for cleaning; for example, by mounting as shown in FIG. 4.

Figure 4:
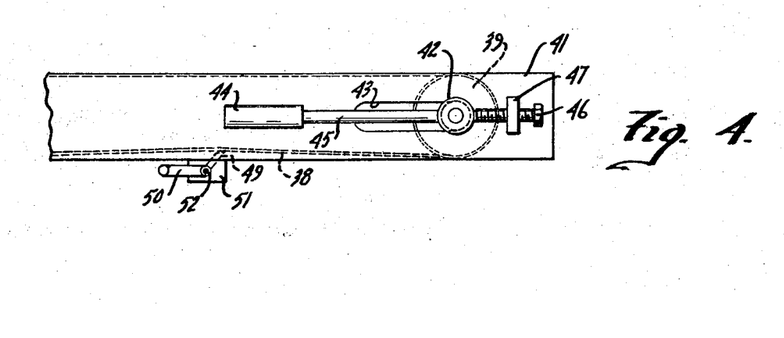
FIG. 4 is an enlarged fragmentary view showing an alternative preferred conveyor belt construction for cleaning of the belting.

Referring to FIG. 4, forward roller 39 is shown rotatably secured in bearing 42 which is movably mounted in a suitable slot 43 in the side arm 41. A hydraulic cylinder unit 44 is secured to the side arm 41 and includes an outwardly projecting piston rod 45 connected to the bearing in any suitable manner. Actuation of the hydraulic cylinder unit 44 allows retraction of the bearings 39 to loosen belt 38 for cleaning purposes such that it can be lifted and readily steam cleaned and scrubbed on the underside as well as the top side. The bearing 39 can be forced outwardly to stretch the belt 38 as shown to provide a supporting surface for the pizza.

Exact parallel positioning of the belt 38 must be maintained to prevent skewing movement of the belt. In the illustrated embodiment, an adjustable stop bolt 46 is secured to the side arm within a threaded nut or stop 47 in front of the bearing 42. The bolt 46 is adjusted to provide accurate positioning of the forward roller 39 by the hydraulic cylinder unit 44 in the extended position and thereby maintain accurate tracking movement of the endless belt 38.

Referring again to FIGS. 1 and 2, a chain and drive sprocket unit 48 connects the shafts of the roller 19 of conveyor 8 and back roller 40 of discharge conveyor 6 to drive belt 38 simultaneously with belts 18.

Some of the cheese or ingredients on the pizza bases may have a tendency to fall onto the endless belt 38 and be carried back to the underside thereof and create an accumulation of such material thereon. In accordance with the present invention, a wiper blade 49 is secured between arms 41 at the underside of the belt 38 and continuously wipes the belt clean to maintain a clean surface to the incoming pizzas. The blade 49 may be fixed or counterbalanced as shown in FIG. 4. Thus, in FIG. 4, a counter balance iron 50 is pivotally secured to a depending support bracket 51 on the underside of arm 41, as at 52. The wiper 49 is secured to the outer end of arms 49 and projects upwardly into engagement with the undersurface of belt 38. Generally, the belt 38 is of a sufficient weight to rest on a fixed wiper. In the case of lighter and smaller belts, the counterweight construction is desirable.

In the illustrated embodiment of the invention, the pizza bases 3 are transferred to applicator 5 over the bridging roller 7 which is rotated with belts 18 and 38. A chain drive connection 53 interconnects the roller 19 to the roller 7, as shown in FIG. 1, to provide the simultaneous drive of the incoming roller 7.

In operation, the chain drives for belt 38 and roller 7 are selected such that they rotate this belt and roller at a slightly greater speed than the belts 18. This has been found to provide optimum transfer of the bases through the assembly. Thus, the infeed roller 7 has been found to provide sufficient movement to maintain the bases in close relation. Similarly, the increased speed of the discharge conveyor 6 has been found to provide for removal and separation of the pizza bases 3. The bases 3 are thereby continuously transferred through the cheese applicator 5 with the shredded cheese applied thereto.

Shredder 12 is of a known construction which takes blocks of cheese, shreds them into the desired shredded cheese, and discharges the cheese onto lift conveyor 11 through a suitable chute means 54.

The lift conveyor includes an endless belt 55 supported at its lower end by a roller 56 and at the top end by a roller 57. The rollers 56 and 57 are rotatably mounted between side walls 58 and 59 secured in laterally spaced relation as a supporting structure immediately adjacent to the main conveyor system. The endless belt 55 extends from below and forwardly of the main base conveyor upwardly and terminates with the upper roller 57 immediately overlying the central portion of the lateral conveyor 10 such that the shredded cheese 12 thereon is deposited onto the lateral conveyor 10. Some of the cheese may have a tendency to stick to the belt and consequently to maintain cleanliness of operation, a counter balanced wiper, not shown, is mounted engaging the underside of the belt 55 immediately adjacent and overlying the receiving end of the lateral conveyor; for example, as shown in FIG. 4.

The endless belt 55 of the conveyor 11 includes an enclosed drive motor and gear reducer unit 60 coupled to the bottom roller 56 by a suitable chain drive 61.

Conveyor 11 also includes a beater 62 rotatably mounted between the side walls 58 and 59 immediately adjacent the lower end of the belt 55 to initiate distribution of the shredded cheese and produce a uniform discharge of it onto the lateral transfer conveyor 10. The beater 62 includes a plurality of distributed beater tines 63 secured to a central shaft 64. The shaft 64 of beater 62 is coupled by a chain drive 65 to the motor-gear reducer unit 60 and simultaneously rotated to engage the shredded cheese deposited on the conveyor belt 55 by shredder 12 and distribute the shredded cheese on the lift belt 55.

Additionally, the overrun belt conveyors 16 and 17 contribute to the cheese on the lift conveyor 11 and each will be similarly constructed. Conveyor 16 is described. The conveyor 16 includes an endless belt 66 extending laterally beneath the top portion of the belts 18 and terminating generally centrally of the lift conveyor 11. The belt 66 is supported at its opposite ends by rollers 67 and 68. Roller 67 is rotatably journalled between suitable side wall structures 69 which project laterally from side wall 22 over conveyor 11. Roller 68 is rotatably supported at the opposite side of conveyor belts 18 on the shaft 36. A motor-gear reducer unit 71 is coupled to roller 68 through suitable gears or a chain drive 72 to drive belt 66.

A counterbalanced wiper, not shown, is preferably secured to engage the underside of the belt 66 immediately adjacent the discharge end of conveyor 16. Consequently, all of the excess shredded cheese is continuously removed.

The belt conveyor 17 is similarly constructed with an endless belt 73 located immediately beneath the joint between the conveyor belts 18 and the discharge conveyor belt 38 with the outer end terminating within an opening 74 in the side wall 59 of conveyor 11. Any cheese which falls therebetween is transferred back to the lift conveyor 11 and returned with the other shredded cheese to the lateral conveyor 10.

The lateral conveyor 10 is similarly constructed as an endless belt unit including an endless transfer belt 75 extending beneath the top of the lift conveyor 11 and cross the cheese transfer conveyor 9. Belt 75 is supported at its opposite ends by suitable rollers 76 and 77 rotatably journaled within suitably spaced side walls 78 and 79. The roller 77 adjacent the conveyor 9 is adjustably mounted to a hydraulic unit, not shown, in accordance with the description of FIG. 4. A drive motor gear reducer unit 80 is mounted adjacent the outer end of the endless belt 75 and coupled to the outer roller 76 to provide for a continuous drive and feed of the movement of the endless belt 75. In operation, the cheese from the lift conveyor 11 is dropped on the continuously moving belt 75 and appears thereon as a continuous stream of shredded cheese. The belt 75 moves over the cheese conveyor 9 and when the aligned portion of belt 75 is filled with cheese, the transfer wiper unit 13 is actuated to wipe the cheese from the transfer belt 75 onto the cheese conveyor 9.

The wiper unit 13 generally includes a rectangular support frame 81 overlying the conveyor 11 and extending rearwardly and forwardly thereof. The frame 81 is mounted above the conveyor 11 by suitable vertical brackets or arms 82 secured to the main side walls 21 and 22. The wiping structure includes angle plate 83 and a flexible wiper blade 84 projecting downwardly therefrom and terminating generally in the level of the belt 75 such that movement over the belt wipes all of the cheese therefrom onto the cheese transfer conveyor 9. A pair of hydraulic cylinder units 85 and 86 is secured to the opposite sides of the rectangular frame 81 behind the conveyor 11 and includes forwardly projecting piston rods 87 and 88, respectively. The ends of plate 83 are secured to the piston rods 87 and 88. A fluid pressure line 89 is connected in common to one corresponding end of the cylinder units 85 and 86. A similar line 90 is connected in common to the opposite ends of the units 85 and 86. When pressure is applied to line 89, line 90 is connected to exhaust. The piston rods 87 and 88 will then be extended to move the wiper 84 forwardly and across the lateral conveyor belt 75. This provides for a transfer onto the cheese conveyor 9 of all of the cheese from the conveyor 10 and to the front side of conveyor 10. When the lateral conveyor belt 75 aligned with the cheese transfer conveyor 9 is again filled with shredded cheese, the line 90 is connected to the positive pressure source and the line 89 is connected to the exhaust whereby the wiper 84 moves back to the original starting position and wipes the shredded cheese onto the cheese conveyor 9 to the opposite or back side of the lateral conveyor 10.

The fluid lines 89 and 90 are connected, as shown by the dashed coupling lines, to a suitable solenoid control valve unit 91 mounted to the front side of the apparatus. The completion of the connection of lines 89 and 90 to the fluid pressure source, not shown, through valve unit 91 may be by any suitable timing means, not shown, to actuate cylinder units 85 and 86 and move wiper 84 in timed relation with the movement of the conveyor 10 such that wiper 84 traverses belt 75 when the belt 75 aligned with conveyor 9 is filled with cheese. Pneumatic micro switches 92 and 93 are mounted immediately adjacent to the discharge end of the lateral belt conveyor 11 and actuated by an arm 94 on the one piston rod 87 and therefore in accordance with the position of the wiper blade 84. The switches 92 and 93 selectively actuate solenoid control valve unit 91 to alternately reverse the movement of the wiper assembly and deposit successive spaced mounds 94 of shredded cheese on conveyor 9.

Thus, the timing means may be interconnected to the movement of the belt 75 and provide a signal to the unit 91 whenever the belt 75 has moved the width of the machine. The unit 91 is then actuated to move wiper blade 84 forwardly to sweep the cheese from the belt 75. When the switch 93 is actuated, it actuates unit 91 to reverse the next wiper movement in response to timed actuation. When the switch 92 is actuated, it resets unit 91 which is then next actuated or recycled by the timing means.

Generally, the cheese conveyor 9 includes an endless belt 95 supported above the conveyor belts 18 at its opposite ends by suitable rollers 96 and 97 rotatably supported within the side walls 21 and 22. A motor-gear reducer unit 98 is mounted to the forward end of the apparatus and coupled to the drive roller 97 to continuously rotate the belt 94 at a selected speed. The roller 96 is adjustably supported by a slidably mounted hydraulically positioned bearing unit, not shown, in accordance with the construction shown in FIG. 4. The shredded cheese is thereby carried by the conveyor belt 95 in a plurality of spaced mounds 94 extending the width of belt 95 toward the discharge end where the rake assembly 14 and the beater 15 distribute and meter the discharge of the cheese.

The beater 15 includes a support cylinder defined by a plurality of circumferentially distributed support rods 99 supported at their opposite ends by suitable rotatably mounted support discs 100. A plurality of generally radial tines 101 are secured in longitudinal spaced relation to each of the support rods 99 and project radially outwardly therefrom. The tines 101 are generally equally spaced on each of the support rods 99 but are offset with respect to all of the tines on the other rod. The beater 15 is driven through a motor-gear reducer unit 102 generally corresponding to that previously described. The beater 15 is rotated in the opposite direction of belt 95 and returns excess shredded cheese to the belt 95. Rotation of the beater 15 maintains a continuous movement over the width of belt 95 with the thickness or amount of the shredded cheese dropping from the discharge end of the belt 95 closely metered by the spacing of the beater 15 with respect to the discharge end of the belt.

The shredded cheese is fed to the discharge end in a generally uniform layer as a result of the rake assembly 14 mounted immediately forwardly of the heater 15. The illustrated rake assembly 14 includes five similar rakes each of which includes a support rod 103 extending laterally over the cheese conveyor 9 with a plurality of depending tines 104. These tines are equally spaced on any one support rod 103 but with the tines on any one rod offset with respect to the tines on all of the other rods. The individual rakes are interconnected to each other in predetermined spaced relation over the conveyor 9 by a pair of connecting rods 105 secured to rods 103 as by welding or the like. The depending tines 104 immediately adjacent to the beater 15 are slanted rearwardly to project towards the beater 15 in closely spaced relation to the tines 101 of the beater 15.

The rake assembly 14 is supported between a pair of angularly related side arms 106 and 107 on the opposite side of the cheese conveyor belt 95. Each of the arms 106 and 107 is generally similarly constructed to provide a drive action as hereinafter described an consequently the one side arm 106 is described.

Referring particularly to FIG. 3, the side arm 106 is provided with a depending hub 108 which is pivotally mounted on the input shaft of beater 15. A depending positioning rod 109 is adjustably locked thereto as by a lock nut 110 and projects downwardly into engagement with the adjacent portion of the side wall 22 to hold the arm projecting rearwardly and upwardly at a selected angle from the pivot mount. A pair of sprocket members 111 and 112 is rotatable secured in spaced relation to the outer portion of arm 106 in accordance with the lateral spacing of the support rods 103 of the rake assembly 14. Concentric cranks 113 are secured to the outer side face of the sprocket members 111 and 112 and extend outwardly with the outer ends connected to the extended end of the correspondingly spaced support rods 103. Consequently, the rotation of the sprockets 111 and 112 causes the eccentric rotation of the cranks 113 with a consequental orbital movement of the rake assembly 14. A chain drive 114 interconnects the sprockets 111 and 112 to provide corresponding directional rotation thereof. Additionally, a chain and sprocket drive 115 interconnects the sprocket 112 to the beater shaft to provide simultaneous and timed movement of the beater with the rake assembly 14. While the beater 15 is rapidly rotating to provide the desired metering of shredded cheese it also tends to throw the cheese rearwardly into the rake assembly 14 which is also constantly moving in a corresponding reverse motion to the incoming cheese to continuously distribute it rearwardly onto the conveyor belt 95 and provide a relatively uniform layer of cheese to the beater. The inclined tines 104 adjacent beater 15 act to take the cheese thrown backwardly by the beater 15 and remove it rearwardly into the rake assembly 14 to maintain a uniform distribution of shredded cheese.

The operation of the cheese applicator 5 can be briefly summarized as follows. The block cheese is fed into the shredder 12 and thereby dropped in a mound onto the lift conveyor 11. As it moves up the lift conveyor, the rotating beater 65 distributes the cheese on the conveyor belt 55 to maintain a more or less uniform layer on the lift conveyor belt. The shredded cheese is carried upwardly and discharged onto the transfer lateral conveyor belt 75 which is moving continuously immediately beneath the upper end of the belt 55. The belt 75 continuously carries the shredded cheese into alignment with the cheese transfer conveyor 9. When the portion of belt 75 overlying the cheese transfer conveyor 9 is completely filled with cheese, the wiper unit 13 is actuated to rapidly move all of the cheese thereon onto the cheese transfer belt 95, either to the front or to the rear side of the lateral conveyor 10 depending upon the previous action of the wiper unit 13. The directional movement is automatically controlled by the pneumatic microswitch units 92 and 93. The shredded cheese mounds 94 on the conveyor belt 95 move into the tines 104 of the rake assembly 14 which are moving in the opposite direction to spread the cheese into a more or less uniform mass on the terminal portion of the belt 95. The cheese then moves into the very terminal end between the belt 95 and beater and is gravity fed onto the pizza bases 3 which are being continuously moved thereunder in a continuous stream. The rapid reverse rotation of the beater 15 maintains a very fine gradation and metering of the shredded cheese onto the pizza bases. The continuously moving pizzas thus are provided with very accurately metered amounts of cheese and transferred to the discharge conveyor unit 6 for subsequent handling. Any of the cheese which falls through the belts 18 is taken by return conveyor 16 to the lift conveyor 11. Similarly, any of the cheese carried on the top of the belts 18 to the terminal end thereof falls onto the return conveyor 17.

When it is desired to clean the apparatus, the whole unit may be washed down with a suitable steam cleaner or the like due to the sealed construction of the several motors and the stainless steel construction of the complete assembly. Additionally, each of the several endless belts is generally provided with the hydraulically positioned bearings such that the slack in the belt can be substantially increased. Consequently, the belt can be lifted and the steam nozzle placed directly on the inner surface of the belts. Further, actual brush cleaning can be provided by manual or automatic brush operation.

Although the pizza bases 3 with the tomato sauce and meat thereon may be manually fed to the cheese applicator, it is preferably automatically supplied thereto with an improved mechanism such as shown in FIGS. 1 and 5.

The sauce and meat applicators 1 and 4, generally include conveyor 2, as a common unit formed by a plurality of narrow endless belts 117 mounted in laterally spaced relation between side walls 118 as in the cheese applicator 5 for transferring of the bases 3 therethrough.

Additionally, a plurality of pairs of aligning bars 119 and 120 span the belts 117 with the opposed edges including curved projections to locate the pizza bases 3 in rows for movement through applicatiors 1 and 4. The bars 119 and 120 project laterally of the belts 117 and are releasably connected to upstanding projections on similar drive chains 121 which are rotatably mounted immediately adjacent the inner surfaces of walls 118.

The belts 117 and chains 121 are similarly driven with a stepped motion through the applicators 1 and 4, as follows. A drive chain 122 connects the forward sprocket 123 to an idler sprocket 124. The sprocket 123 is supported on a shaft 123a common to the shaft to which the drive chains 117 and 121 are connected by suitable sprockets or the like. The chain 122 includes upstanding projections 125 selectively engaged with a hydraulically acutated drive arm 126 which reciproates to rotate chain 122 and the sprocket 123. A hydraulic unit 127 is mounted to the outer surface of the side wall and includes an operating piston shaft 128 connected to arm 126. As shaft 128 is extended arm 126 engages an upstanding projection 125 and rotates the chain 122 for one step and correspondingly rotates the sprocket 123 and attached shaft to correspondingly rotate the belts 117 and the chains 121. This carries the previously disposed pizza bases 3, as shown in FIG. 1, to the right. This also rotates the trailing bars 119 and 120 onto the top leading end of the machine and pizzas are manually or otherwise placed between the bars 119 and 120. On the return movement of the shaft 128 of hydraulic unit 127, arm 126 which is pivotally secured to shaft 128, as shown, rides upwardly over the following projection 125 and is thus in position for the next step. During the forward step movement, arm 126 is held against pivotal movement by the stop 128a.

A sauce reservoir 129 is mounted below the endless belts 117 and a spray nozzle 130 is mounted in spaced aligned relation above the top portion of the endless belts 117. A suitable pump 131 or the like is connected to the pan or reservoir 129 and to the nozzle 130 through a semiflexible line 132. Nozzle 130 is mounted for lateral movement over belts 117 on a suitable track 133 and is connected to a pulley drive unit 134 for movement back and forth across the belts. The pulley drive unit 134 is shown as a belt 134a encircling pulleys 134b and 134c on opposite sides of the applicator 1. A small reversible motor 134d or the like is coupled to pulley 134c to cause the belt to move back and forth and provide proper movement of nozzle 130. The row of bases 3 is stepped into alignment with the nozzle 130 which is then actuated to move across the belts 117 and discharge a selected quantity of sauce upon the bases. The excess sauce, if any, drops through the belt structure to the reservoir 129. Cover plates or strips 135 may be provided overlying the return portion of belts 117 to limit any buildup of sauce thereon. Additionally, an idler roller 136 is shown raising the belts 117 above reservoir 129 on the return portion. Suitable wiper blades 137 and 138 are mounted to engage the belts 117 to further remove excess sauce before the belts move to receive new bases 3.

The spray nozzle 130 may include an adjustable orifice means for varying the amount of sauce discharged with respect to the size of the pizza bases 3. Further, a plurality of small tubes may be provided to wipe the sauce onto the bases.

The sauce covered pizza bases 3 are then automatically stepped from the sauce applicator into the meat applicator 4.

In the illustrated embodiment of the invention, the meat applicator 4 includes a patty forming plate 139 slidably mounted within a base slot in the opposite walls of sausage or similar ground meat chamber 140 connected to a source through suitable line 140a including check valve 140b. A hydraulic piston unit 140c is mounted on chamber 140 to positively force the meat toward plate 139. The chamber forms a part of a pressurized meat source which forces the meat toward plate 139. One end of the plate is an imperforate surface whereas the opposite end includes groups of small openings 141 such that when the latter portion is disposed within chamber 140 the openings are filled with meat. The groups of openings 141 are laterally spaced in accordance with the positioning of bases 3 within each row and the plate 139 is selectively positioned overlying the conveyor and aligned with the row of bases. In the illustrated embodiment, plate 139 includes a depending arm 142 secured to the piston rod 138 for selective positioning in timed relation to the movement of the conveyor mechanism. A transfer plate 143 is mounted above and in alignment with the position of the apertured plate 139 and includes ejector pins 144 arranged in accordance with the groups of openings 141 for forcing of the sausage from openings 141 onto the aligned pizza bases 3. A suitable hydraulic actuator or unit 145 is secured to the plate 143 for selectively depressing the plate 143 to eject the sausage onto the bases 3. The plates 139 and 143 are preferably provided with thermostatically controlled heating units 146 such that the ejector pins 144 and walls of the opening are at a suitable temperature to avoid sticking of the sausage or other meat due to the fat content.

In operation, the bases 3 step through the sausage applicator 4 and mementarily stop to permit application of the sausage to the pizza bases. Simultaneously, sauce is being applied to the succeeding row of bases which are moved into the sausage applicator by the next stepped movement of the drive. The actuation of hydraulic unit 127 also retracts plate 139 into chamber 140 to again fill openings 141. The return or reset movement of the unit 128 to reset the step arm to the next lug 125 also again positions plate 139 with filled openings 141 aligned with the succeeding row of bases. The pizza bases, with the sauce and sausage properly positioned thereon, are fed into the cheese applicator 5 as heretofore discussed.

In summary, the pizza bases 3 are fed into the sauce applicator 1 in side-by-side positioned relation and as they move therethrough, a preselected amount of sauce is applied through the operation of the nozzle 130. They then are stepped into the sausage applicator 4 where the sausage is applied; after which they move through the cheese applicator 5 where the cheese is applied. The completed pizzas are discharged to the discharge conveyor 6 for subsequent handling either automatically or manually.

In the present invention, the sauce, the meat and the cheese are separately and closely metered within fractions of an ounce to provide good quality control and uniform distribution of the products in accordance with predetermined requirements. The ingredients are supplied to the base members in a completely automatic system by providing properly timed operation of the motors, hydraulic units and the like through any suitable electrical pneumatic or other control which can be readily constructed from readily available units and circuits which need not therefore be shown herein. The sauce can be controlled by the speed of traversing the row of pizza bases, the size or number of nozzles and the like. The meat can be readily controlled by the size and number of meat openings in the plate. The plate will also normally be changed for different size pizza bases. The shredded cheese is readily controlled by controlling the belt speed and particularly the relative speed of the belts 95 and 18 as well as the beater 15.

The present invention thus provides a highy improved pizza forming or processing apparatus eliminating substantially the greater share of manual labor heretofore required and further decreasing the processing time. Further, the application of the various ingredients can be very accurately controlled to maintain a predetermined quality of all the products made.

Various modes of carrying out the invention are contemplated as being within the scope of the following claims particularly pointing out and distinctly claiming the subject matter which is regarded as the invention.

I claim:
1. In a pizza forming apparatus for applying the several ingredients to successive rows of pizza bases,
   an endless belt conveyor including a plurality of laterally spaced endless belts for supporting successive rows of pizza bases,
   a sauce applicator having an entrance side and a discharge side with the conveyor moving therethrough and means for continuously depositing a tomato sauce downwardly over the conveyor and upon the plurality of pizza bases in an aligned row,
   a meat applicator overlying the conveyor to the discharge side of the sauce applicator for applying distributed and metered amounts of a meat simultaneously to each of the side-by-side pizza bases, in the aligned rows, said applicator including a perforated plate extending laterally of the conveyor and having groups of openings spaced in accordance with the bases in a row and means for filling said openings and subsequently ejecting the meat downwardly therefrom, and
   a shredded cheese applicator for applying metered amounts of shredded cheese to each of the side-by-side pizza bases including means for progressively moving the pizza bases beneath a shredded cheese transfer belt to receive shredded cheese falling from the end thereof, said cheese applicator including a metering means movably mounted adjacent the end of the transfer belt to closely regulate the amount of shredded cheese falling onto the rows of pizza bases.

2. In a distributing apparatus for distributing shredded cheese and the like upon a plurality of individual members,
  a main feed conveyor including a plurality of laterally spaced narrow feed elements adapted to continuously move the members in a longitudinal direction thereon,
  a shredded cheese belt conveyor overlying said main feed conveyor for carrying the shredded cheese and gravity feeding the same from the end thereof,
  a rotating tined beater rotatably mounted across the end of the cheese belt conveyor and rotating in the opposite direction of the belt conveyor to meter the shredded cheese being fed from the belt conveyor, and
  rake means mounted forwardly of the beater to form a substantially uniform layer of shredded cheese on the belt conveyor at the discharge end thereof.

3. In a distributing apparatus for distributing shredded cheese and the like upon a plurality of individual members,
  a main feed conveyor including a plurality of laterally spaced narrow feed elements adapted to continuously move the members in a longitudinal direction thereon,
  a shredded cheese belt conveyor overlying said main feed conveyor for carrying the shredded cheese and gravity feeding the same from the end thereof,
  a rotating beater member rotatably mounted adjacent the discharge end of the cheese belt conveyor and cooperating therewith to define a metering opening, and
  means to rotate the beater in the opposite direction of the cheese belt conveyor, the amount being transferred to the individual members being controlled by the relative speeds of the conveyors and the beater.

4. In a distributing apparatus for distributing shredded cheese and the like upon a plurality of individual members,
  a main feed conveyor including a plurality of laterally spaced narrow feed elements adapted to continuously move the members in a longitudinal direction thereon,
  a shredded cheese belt conveyor overlying said main feed conveyor for carrying the shredded cheese and gravity feeding the same from the end thereof,
  means cooperating with the end of the conveyor to meter the shredded cheese being fed from the conveyor.
  means to supply shredded cheese to the cheese belt and including a lift means extending upwardly below and to one side of the discharge end of the cheese belt and aligned feed conveyor, and
  a first return conveyor including an endless belt rotating laterally immediately below the main conveyor and the discharge end of the cheese feed belt for transferring excess cheese back to the lift means.

5. A shredded cheese distributing apparatus for simultaneously applying cheese to a plurality of pizza bases in a continuous manner, comprising
  a main conveyor for moving pizza bases in a continuous manner between a conveyor inlet end and a conveyor discharge end, said conveyor including a plurality of similar laterally spaced narrow endless belts passing about a pair of longitudinally spaced aligned rollers and a tension means, said rollers being resiliently loaded by said tension means to tension the belts, a support strip for each of said belts extending between said rollers to hold the upper portion of each belt in a selected plane and forming a support for said pizza bases,
  an endless cheese feed belt rotatably mounted above said main conveyor and extending laterally coextensively with said narrow endless belts, said feed belt having an incoming end and having a discharge end located in inwardly spaced relation to the corresponding end of the main conveyor to permit gravity feed of shredded cheese from the discharge end thereof onto the main conveyor and the pizza bases thereon,
  a rake assembly overlying the cheese feed belt immediately forwardly of the discharge end and including a plurality of depending prong means, drive means to move said rake assembly in an orbital manner with the rake assembly moving rearwardly in the lower position for continuously spreading mounds of shredded cheese advanced on the feed belt more or less uniformly thereon to prevent delivery of mounds of shredded cheese to the main conveyor, and
  means extending laterally over the incoming end of the cheese feed belt for periodically supplying mounds of shredded cheese to the feed belt.

6. The apparatus of claim 5 wherein the last named means includes an endless transfer belt moving across the feed belt,
  a wiper unit aligned with the cheese feed belt and including a reciprocating wiper blade for sweeping across the transfer belt to move the shredded cheese onto the cheese feed belt and including a pair of hydraulic cylinder units secured to each end of the wiper for moving the same across the belt,
  control means actuated in timed relation to movement of the transfer belt to actuate the hydraulic cylinder units.

7. A shredded cheese distributing apparatus for simultaneously applying cheese to pizza bases in a continuous manner, comprising
  a main conveyor for moving pizza bases in a continuous manner between a conveyor inlet end and a conveyor discharge end,
  an endless cheese feed belt rotatably mounted above said main conveyor and extending laterally coextensively therewith, said feed belt having an incoming end and having a discharge end located in inwardly spaced relation to the corresponding end of the main conveyor,
  a beater having a central support means rotatably mounted immediately above the discharge end of the feed belt and having a plurality of circumferentially spaced metering means projecting outwardly of the support means and terminating in closely spaced relation to the feed belt, and
  means to rotate the beater in the direction opposite the movement of the feed belt.

8. The apparatus of claim 7 wherein said main conveyor includes a plurality of similar laterally spaced narrow endless belts passing about a pair of longitudinally spaced aligned rollers and a tension roll, said rollers being formed as continuous members having grooves therein for each of said belts,
  a support strip for each of said belts extending between said rollers to hold the upper portion of each belt in a selected plane and forming a support for said pizza bases,
  the rotation of the beater in the opposite direction of the feed belt causing said metering means to force back shredded cheese thereon,
  a rake assembly overlying the cheese feed belt immediately forwardly of the beater to backwardly move the shedded cheese forced back by the beater and prevent abnormal buildup of shredded cheese adjacent the batter, and
  means to supply shredded cheese to the cheese feed belt.

9. The apparatus of claim 8 wherein said rake assembly includes a plurality of parallel interconnected rakes and a plurality of depending tines, drive means for moving said rakes in an orbital motion and means to connect the drive means to the means to rotate the beater.

10. The apparatus of claim 8 wherein the last named means includes a transfer belt rotatably mounted extending laterally over the incoming end of the cheese feed belt and having an end extending laterally to one side thereof, a wiper unit aligned with the cheese feed belt and including a reciprocating wiper blade for sweeping across the transfer belt to move the shredded cheese onto the cheese feed belt, and control means actuated in timed relation to movement of the transfer belt to actuate the wiper unit.

11. The apparatus of claim 10 having means to supply cheese to the transfer belt and including a cheese lift conveyor including an endless belt mounted to the extending end of the transfer belt and having its upper end terminating above and over the transfer belt and its lower end below and outwardly of the main conveyor, and means to supply shredded cheese to the lift belt immediately below the beater.

12. The apparatus of claim 11 wherein said main conveyor includes openings through which shredded cheese which is not deposited on a pizza base falls having shredded cheese return means including, a first return conveyor including an endless belt extending laterally of the main conveyor immediately below the discharge end of the main conveyor for transferring the cheese which falls through the main conveyor back to the lift conveyor, and a second return conveyor including an endless belt extending laterally of the main conveyor immediately below the discharge end of the main conveyor.

13. A shredded cheese distributing apparatus for simultaneously applying cheese to pizza bases in a continuous manner, comprising a main conveyor for moving pizza bases in a continuous manner between a conveyor inlet end and a conveyor discharge end, said conveyor including a plurality of similar laterally spaced narrow endless belts passing about a pair of longitudinally spaced aligned rollers and a tension roll, said rollers being formed as continuous members having grooves therein for each of said belts, each of said tension rolls being mounted upon an arm pivotally secured to the frame structure and spring means to load the arms, a support strip for each of said belts extending between said rollers to hold the upper portion of each belt in a selected plane and forming a support for said pizza bases, an endless cheese feed belt rotatably mounted above said main conveyor and extending laterally coextensively with said narrow endless belts, said transfer belt having a discharge end located in inwardly spaced relation to the corresponding end of the main conveyor, a beater rotatably mounted immediately above the discharge end of the feed belt and including a plurality of radial tines terminating in closely spaced relation to the feed belt, means to rotate the beater in the opposite direction of the feed belt, a rake assembly overlying the cheese feed belt immediately forwardly of the beater and including a plurality of rakes each including a support shaft and a plurality of depending tines, said rakes being connected to common support rods, two of said shafts projecting outwardly and being similarly secured to similar eccentric crank members at the opposite ends, support arms having said crank members rotatably secured thereto and interconnected by a chain and sprocket drive to similarly rotate the same whereby said rakes move in an orbital manner, said arms being supported to extend upwardly and rearwardly from the beater to the infeed end of the cheese feed belt, the rake immediately adjacent the beater being angularly displaced toward the beater with respect to the other rakes to move into the material forced back by the beater and prevent abnormal buildup of shredded cheese adjacent the beater, a transfer belt rotatably mounted extending laterally over the incoming end of the cheese feed belt and extending laterally to one side thereof, a wiper unit aligned with the cheese feed belt and including a reciprocating wiper blade for sweeping across the transfer belt to move the shredded cheese onto the cheese feed belt and including a pair of hydraulic cylinder units secured to each end of the wiper for moving the same across the belt, control means actuated in timed relation to movement of the transfer belt to actuate the hydraulic cylinder units, a cheese lift conveyor including an endless belt mounted to the extended side of the lateral transfer belt and having its upper end terminating above and over the transfer belt and its lower end below and outwardly of the main conveyor, a beater mounted immediately above the lower portion of the lift belt for distributing the cheese thereon, means to supply shredded cheese to the lift belt immediately below the beater, a first return conveyor including an endless belt rotating laterally of the main conveyor immediately below the discharge end of the main conveyor for transferring cheese which falls between the narrow endless belts of the main conveyor back to the lift conveyor, and a second return conveyor including an endless belt rotating laterally of the main conveyor immediately below the discharge end of the main conveyor.

14. In a pizza forming apparatus for applying meat to successive rows of pizza bases, a meat applicator for applying distributed and metered amounts of meat simultaneously to each of the pizza bases in a row, comprising a conveyor to move successive rows of pizza bases, a pressurized meat chamber having a transfer plate slidably mounted for movement therethrough, said plate overlying the path of each row of pizza bases and having grouped openings spaced in accordance with the pizza bases, said transfer plate being moved to dispose the openings within the chamber to fill the openings with meat and then moved outwardly to sever the meat in the opening from the meat in the chamber and into aligned overlying relationship to a row of pizza bases, reciprocating ejector rods mounted to one side of the chamber and arranged in accordance with the openings in the transfer plate, and means to actuate the ejector means with the openings in the transfer plate aligned with the ejector rods for transferring the meat in the openings to the pizza bases.

15. In a pizza forming apparatus for applying the several ingredients to successive rows of a plurality of pizza bases, a sauce applicator having a conveying means for moving successive rows of pizza bases beneath a sauce discharge means for discharging sauce across the path of a row of pizza bases, said conveying means means being of an open construction to permit sauce to pass downwardly therethrough, a meat applicator having a meat discharge means for applying a plurality of distributed metered amounts of meat simultaneously to each base in a row of pizza bases advanced on said conveying means, a shredded cheese applicator having a conveying means for moving successive rows of pizza bases beneath a shredded cheese discharge means for applying metered amounts of shredded cheese to a row of pizza bases, said last named conveying means being of an open construction to permit shredded cheese to pass therethrough, and means to actuate the conveying means and sequentially transfer the rows of pizza bases through said applicators, said rows of pizza bases being passed through said cheese applicator only after passing through said other applicators.

16. In a distributing apparatus for forming a pizza and including means for distributing shredded cheese and the like upon a plurality of individual base crust members, a main feed conveyor adapted to support and continuously move a plurality of laterally spaced members in a longitudinal direction thereon, said conveyor being of a generally open construction, a shredded cheese belt conveyor overlying said main feed conveyor for carrying shredded cheese and gravity feeding the same from the end thereof onto the main feed conveyor to apply shredded cheese to the members with shredded cheese not falling on said members being free to fall through the main feed conveyor, and means cooperating with the end of the belt conveyor to meter the shredded cheese from the belt conveyor.

References Cited

UNITED STATES PATENTS

| | | |
|---|---|---|
| 2,190,483 | 2/1940 | Pacilio. |
| 2,943,599 | 7/1960 | Heck _____________ 118—308 |
| 3,136,268 | 6/1964 | Gageant. |

WALTER A. SCHEEL, *Primary Examiner.*

J. SHEA, *Assistant Examiner.*

UNITED STATES PATENT OFFICE
CERTIFICATE OF CORRECTION

Patent No. 3,368,501                          February 13, 1968

Harvey G. Kuhlman

It is certified that error appears in the above identified patent and that said Letters Patent are hereby corrected as shown below:

Column 5, line 61, after "applicator" insert -- 5 --. Column 9, line 9, "heater" should read -- beater --. Column 10, line 48, "applicatiors" should read -- applicators --. Column 11, line 70, "mementarily" should read -- momentarily --. Column 13, line 49, "conveyor." should read -- conveyor, --. Column 14, line 69, "batter" should read -- beater --. Column 15, line 13, "extending" should read -- extended --.

Signed and sealed this 21st day of October 1969.

(SEAL)
Attest:

Edward M. Fletcher, Jr.
Attesting Officer

WILLIAM E. SCHUYLER, JR.
Commissioner of Patents